(12) United States Patent
Yokoyama

(10) Patent No.: US 8,016,493 B2
(45) Date of Patent: Sep. 13, 2011

(54) MAGNETIC COUPLING AND CAMERA PLATFORM USING MAGNETIC COUPLING

(75) Inventor: Akira Yokoyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 638 days.

(21) Appl. No.: 12/035,361

(22) Filed: Feb. 21, 2008

(65) Prior Publication Data

US 2008/0207336 A1   Aug. 28, 2008

(30) Foreign Application Priority Data

Feb. 22, 2007   (JP) .................... 2007-042659

(51) Int. Cl.
  *G03B 17/00*   (2006.01)
(52) U.S. Cl. .......................... 396/428; 464/29
(58) Field of Classification Search ............ 464/29; 310/103; 108/5; 248/349.1; 359/696, 824; 396/428
See application file for complete search history.

(56) References Cited

U.S. PATENT DOCUMENTS 5,090,531 A * 2/1992 Carlson ................ 464/29 X
7,482,721 B2 * 1/2009 Kobayashi ............ 310/103 X

FOREIGN PATENT DOCUMENTS

| FR | 1.170.098 | * | 1/1959 | ............ 464/29 |
| JP | 11-082631 | | 7/1989 | |
| JP | 5-280550 A | * | 10/1993 | ............ 464/29 |
| JP | 07-111772 | | 4/1995 | |
| JP | 11-013855 | | 3/1999 | |

* cited by examiner

*Primary Examiner* — Greg Binda
(74) *Attorney, Agent, or Firm* — Canon USA Inc IP Division

(57) ABSTRACT

A coupling configured to transmit rotation of a drive shaft to a driven shaft by magnetic force includes a drive portion configured to rotate integrally with the drive shaft, a driven portion configured to rotate integrally with the driven shaft, and a buffer member located in contact with both the drive portion and the driven portion.

6 Claims, 6 Drawing Sheets

MAGNETIC COUPLING AND CAMERA PLATFORM USING MAGNETIC COUPLING

BACKGROUND OF THE INVENTION

1. Field of the Invention

The present invention relates to a magnetic coupling configured to transmit power from a drive shaft to a driven shaft, and also relates to a camera platform that uses a magnetic coupling.

2. Description of the Related Art

Generally, a magnetic coupling is capable of transmitting power of shafts in a non-contact manner by using a magnetic force acting between a magnet located at a drive shaft and a magnet located at a driven shaft. Further, the magnetic coupling has a high silencing performance in comparison with a mechanical coupling. The magnetic coupling, however, may cause a phase difference in rotation between the drive shaft and the driven shaft since the magnetic coupling transmits power in a non-contact manner. The phase difference may generate vibration in the circumferential direction at the driven shaft because the magnet located at the drive shaft and the magnet located at the driven shaft attract each other according to magnetic force that occurs between them.

According to Japanese Patent Application Laid-Open No. 07-111772, magnet portions are mounted on the drive shaft and the driven shaft respectively facing each other, wherein either one of these magnet portions includes two magnets. These two magnets are displaced in the opposite circumferential direction respectively relative to the other magnet portion. In a neutral position, the two magnets generate supporting force in the circumferential direction between the drive shaft and the driven shaft. The supporting force can reduce the occurrence of a phase difference, thus suppressing vibration occurring in the circumferential direction.

Japanese Patent Application Laid-Open No. 11-013855 discusses a detecting unit that can accurately detect displacement of a relative position between a drive shaft and a driven shaft to implement a method for performing feedback control of a source of power, such as a motor, connected to the drive shaft according to an output from the detecting unit so as to dampen vibrations occurring at the driven shaft.

Although the method discussed in Japanese Patent Application Laid-Open No. 07-111772 generates a supporting force in the circumferential direction in a neutral position and reduces the occurrence of a phase difference, it is difficult to completely prevent the occurrence of a phase difference because the magnetic coupling uses a non-contact type power transmission. It is also difficult to perform precise control, according to Japanese Patent Application Laid-Open No. 07-111772, since no method is available for damping a vibration itself occurring in the circumferential direction.

Although the method discussed in Japanese Patent Application Laid-Open No. 11-013855 enables quickly damping vibrations of the driven shaft in the circumferential direction by performing feedback control of a source of power based on an output from the detecting unit, the method requires a complex configuration to perform feedback control.

SUMMARY OF THE INVENTION

The present invention is directed a magnetic coupling that enables damping vibrations occurring at the magnetic coupling while maintaining a silencing performance unique to the magnetic coupling without complex configuration, and also enables precision control by reducing a phase difference. The present invention is also directed to a camera platform using the magnetic coupling.

According to an aspect of the present invention, a coupling configured to transmit rotation of a drive shaft to a driven shaft by magnetic force is provided. The coupling includes a drive portion configured to rotate integrally with the drive shaft, a driven portion configured to rotate integrally with the driven shaft, and a buffer member located in contact with both the drive portion and the driven portion.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 1A:
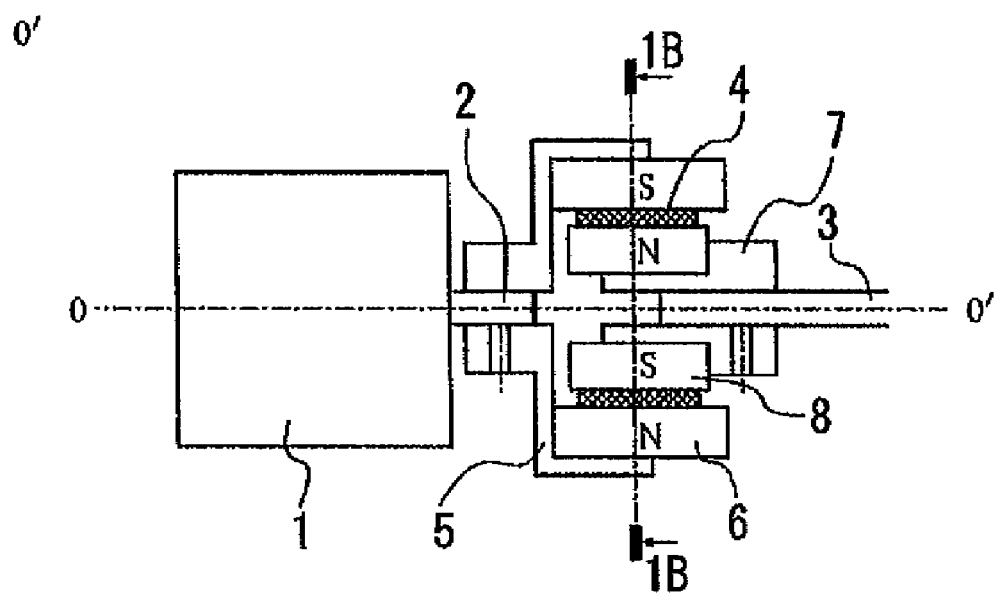
FIGS. 1A and 1B illustrate a configuration of a magnetic coupling according to a first exemplary embodiment of the present invention.
Figure 1B:
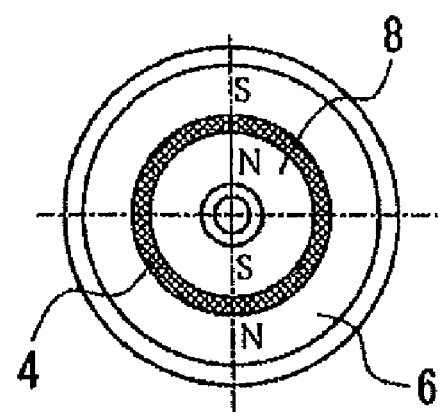

FIGS. 1A and 1B illustrate a configuration of a magnetic coupling according to a first exemplary embodiment of the present invention. FIG. 1B is a cross-sectional view taken along line 1B-1B in FIG. 1A.

A motor 1, acting as a driving source, includes a motor output shaft 2. The magnetic coupling (joint) transmits rotation of the motor output shaft 2 to a driven shaft 3 using magnetic coupling technology to drive a load (not illustrated). A drive-side flange 5, serving as a drive-side holding member, is fixed to the motor output shaft 2 with a given fixing member, such as a set screw. A cylindrical magnet 6, serving as a first magnet, is fixed to the drive-side flange 5 with a given fixing member, such as an adhesive agent. The drive-side flange 5 and the magnet 6 constitute a drive-side magnetic force portion. A driven-side flange 7, serving as a driven-side holding unit, is fixed to the driven shaft 3 with a given fixing member, such as a set screw. A cylindrical magnet 8, serving as a second magnet, is fixed to the driven-side flange 7 with a given fixing member, such as an adhesive agent. The driven-side flange 7 and the magnet 8 constitute a driven-side magnetic force portion.

The magnet 6, serving as the first magnet, and the magnet 8, serving as the second magnet, are magnetized into at least a pair of magnetic poles to enable transmitting rotation. Thus, an attraction force acts in both magnets 6 and 8 to attract each other. In other words, a magnetic force acts between the drive-side magnetic force portion and the driven-side magnetic force portion.

According to the present exemplary embodiment, a buffer member 4, made of rubber with a predetermined rubber hardness, is located between the magnet 6, as a part of the drive-side magnetic force portion, and the magnet 8, as a part of the driven-side magnetic force portion. The buffer member 4 is located while being compressed a predetermined amount to have a predetermined thickness in the direction of connecting the magnet 6 and the magnet 8. The buffer member 4 is not necessarily located on the entire circumference of a circular arc portion (approximately circular arc portion) of either the drive-side magnetic force portion or the driven-side magnetic force portion. For example, the buffer member 4 can be located on 50% or more, alternatively, 80% or more, further alternatively, 80% or more and less than 96%, of the entire circumference. The buffer member 4 can be sponge or magnetic fluid.

Although the buffer member 4 is configured to be in contact between the magnet 6 and the magnet 8 according to an exemplary embodiment, the buffer member 4 can be configured, for example, to be in contact with the drive-side flange 5, as a part of the drive-side magnetic force portion, and the driven-side flange 7, as a part of the driven-side magnetic force portion. Furthermore, the buffer member 4 can also be configured to be in contact with the magnet 6, as a part of the drive-side magnetic force portion, and the driven-side flange 7, as a part of the driven-side magnetic force portion. Alternatively, the buffer member 4 can be configured to be in contact with the entire drive-side magnetic force portion, including the magnet 6 and the drive-side flange 5, and the entire driven-side magnetic force portion, including the magnet 8 and the driven-side flange 7. The present exemplary embodiment is not limited to the configuration illustrated herein as long as the buffer member 4 is configured to be in contact between the drive-side magnetic force portion and the driven-side magnetic force portion.

When the motor output shaft 2 rotates in a predetermined direction at a predetermined speed with the motor 1 as a driving source, the magnet 6 rotates via the drive-side flange 5. Since the magnet 8 is attracted by the magnet 6 to transmit rotation, the rotation of the magnet 8 is transmitted to the driven-shaft 3 via the driven-side flange 7. Thus, force from the motor 1 is transmitted to a load (not illustrated).

The buffer member 4 concurrently contacts an inner-circumferential surface of the magnet 6 and an outer-circumferential surface of the magnet 8. Frictional force or attraction force, or both of them, occur between each of the inner-circumferential surface of the magnet 6 and the outer-circumferential surface of the magnet 8 and the buffer member 4. As a result, the buffer member 4 can dampen vibrations occurring due to a phase difference in rotation between the magnet 6 and the magnet 8. Either or both of the frictional force and the attraction force occurring between the buffer member 4 and the magnets 6 and 8 can reduce a phase difference occurring between the motor output shaft 2 and the driven shaft 3.

Figure 2:
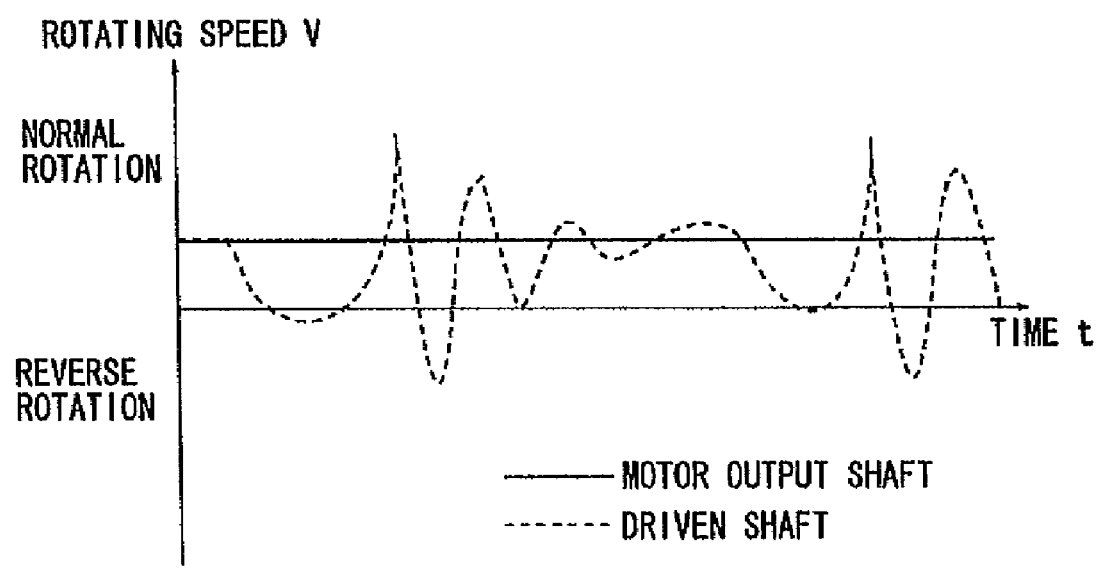
FIG. 2 illustrates a relationship between the rotating speed of a motor output shaft and that of a driven shaft in a magnetic coupling when the magnetic coupling has no buffer member.

FIG. 2 is an example of a graph that illustrates the rotating speed of the motor output shaft 2 and the rotating speed of the driven shaft 3 when the magnetic coupling has no buffer member 4. The motor output shaft 2 rotates at a constant speed since the motor 1 directly drives the motor output shaft 2. Since the driven shaft 3 is always applied with a load (not illustrated), a phase difference occurs between the rotation of the magnet 6 and the rotation of the magnet 8 in the magnetic coupling. As a result, since the driven shaft 3 is repeatedly attracted by an attraction force occurring between the magnet 6 and the magnet 8, a vibrational behavior occurs at the driven shaft 3 and the movement of the driven shaft 3 becomes unstable.

Figure 3:
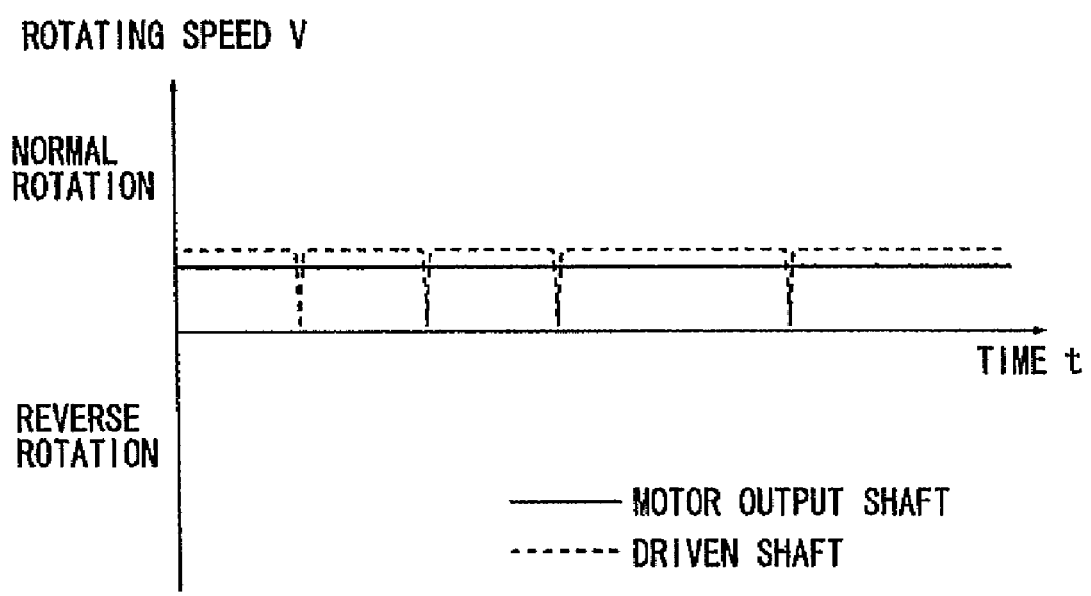
FIG. 3 illustrates a relationship between the rotating speed of a motor output shaft and that of a driven shaft in a magnetic coupling when the magnetic coupling has a buffer member.

FIG. 3 is an example of a graph that illustrates the rotating speed of the motor output shaft 2 and the rotating speed of the driven shaft 3 when the magnetic coupling has the buffer member 4. Although the driven shaft 3 is always applied with a load (not illustrated), frictional force and attraction force occur between the buffer member 4 and the magnets 6 and 8. Accordingly, the vibration of the driven shaft 3 is damped and the phase difference is reduced. Thus, the rotation of the motor output shaft 2 is almost directly transmitted to the driven shaft 3. Although, in FIG. 3, a solid line for the rotating speed of the motor output shaft 2 and a dash line for the rotating speed of the driven shaft 3 are illustrated slightly away from each other for the purpose of comparison, these lines actually overlap each other. Referring to FIG. 3, a vibration occurring at the driven shaft 3 is damped such that the rotation of the driven shaft 3 is almost synchronized with the rotation of the motor output shaft 2, except pulse waveforms caused by the vibration of the motor 1 at the motor output shaft 2.

Even if the cylindrical magnets 6 and 8 include a plurality of magnets to form a cylindrical shape, similar advantageous effects can be obtained. The magnets 6 and 8 can be located as a plurality of given shaped magnets in a circular arc state instead of a cylindrical shape.

Furthermore, the magnets 6 and 8 can be magnetized into magnetic poles of the same polarity, thus exerting force for repelling each other, to enable transmitting rotation.

Second Exemplary Embodiment

Figure 4A:
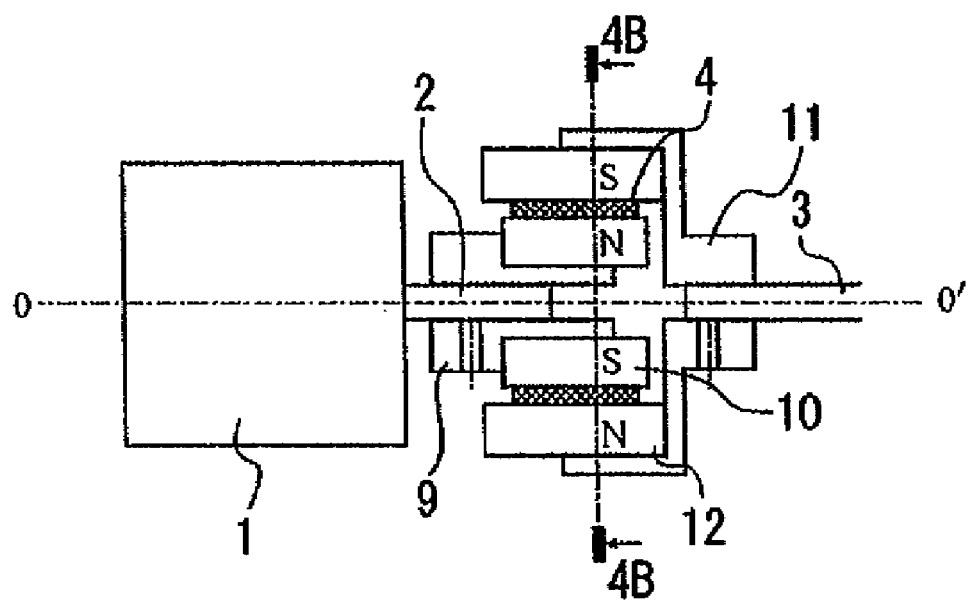
FIGS. 4A and 4B illustrate a configuration of a magnetic coupling according to a second exemplary embodiment of the present invention.
Figure 4B:
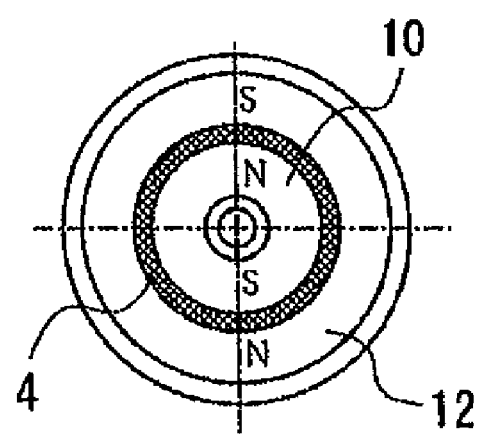

FIGS. 4A and 4B illustrate a configuration of a magnetic coupling according to a second exemplary embodiment of the present invention. FIG. 4B is a cross-sectional view taken along line 4B-4B in FIG. 4A.

A motor 1, acting as a driving source, transmits rotation of a motor output shaft 2 to a driven shaft 3 to drive a load (not illustrated). A drive-side flange 9, serving as a drive-side holding unit, is fixed to the motor output shaft 2 with a given fixing member, such as a set screw. A cylindrical magnet 10, serving as a first magnet, is fixed to the drive-side flange 9 with a given fixing member, such as an adhesive agent. The drive-side flange 9 and the magnet 10 constitute a drive-side magnetic force portion. A driven-side flange 11, serving as a driven-side holding unit, is fixed to the driven shaft 3 with a given fixing member, such as set screws. A cylindrical magnet 12, serving as a second magnet, is fixed to the driven-side flange 11 with a given fixing member, such as an adhesive agent. The driven-side flange 11 and the magnet 12 constitute a driven-side magnetic force portion.

The magnet 10, serving as the first magnet, and the magnet 12, serving as the second magnet, are magnetized into at least a pair of magnetic poles to enable transmitting rotation. Thus, an attraction force acts in both magnets 10 and 12 to attract each other. In other words, a magnetic force acts between the drive-side magnetic force portion and the driven-side magnetic force portion.

According to the present exemplary embodiment, a buffer member 4, made of rubber with a predetermined rubber hardness, is located between the magnet 10, as a part of the drive-side magnetic force portion, and the magnet 12, as a part of the driven-side magnetic force portion, with a predetermined width and a predetermined deformation amount. The buffer member 4 can be sponge or magnetic fluid.

Although the buffer member 4 is configured to be in contact between the magnet 10 and the magnet 12 according to an exemplary embodiment, the buffer member 4 can be configured, for example, to be in contact with the drive-side flange 9, as a part of the drive-side magnetic force portion, and the driven-side flange 11, as a part of the driven-side magnetic force portion. Furthermore, the buffer member 4 can also be configured to be in contact with the magnet 10, as a part of the drive-side magnetic force portion, and the driven-side flange 11, as a part of the driven-side magnetic force portion. Alternatively, the buffer member 4 can be configured to be in contact with the entire drive-side magnetic force portion, including the magnet 10 and the drive-side flange 9, and the entire driven-side magnetic force portion, including the magnet 12 and the driven-side flange 11. The present exemplary embodiment is not limited to the configuration illustrated herein as long as the buffer member 4 is configured to be in contact between the drive-side magnetic force portion and the driven-side magnetic force portion.

When the motor output shaft 2 rotates in a predetermined direction at a predetermined speed with the motor 1 as a driving source, the magnet 10 rotates via the drive-side flange 9. Since the magnet 12 is attracted by the magnet 10 to transmit rotation, the rotation of the magnet 12 is transmitted to the driven-shaft 3 via the driven-side flange 11. Thus, force from the motor 1 is transmitted to a load (not illustrated).

The buffer member 4 concurrently contacts an inner-circumferential surface of the magnet 10 and an outer-circumferential surface of the magnet 12. Frictional force or attraction force, or both of them, occur between each of the inner-circumferential surface of the magnet 10 and the outer-circumferential surface of the magnet 12 and the buffer member 4. As a result, the buffer member 4 can dampen vibrations occurring due to a phase difference in rotation between the magnet 10 and the magnet 12. Either or both of the frictional force and the attraction force occurring between the buffer member 4 and the magnets 10 and 12 can reduce a phase difference occurring between the motor output shaft 2 and the driven shaft 3.

According to the present exemplary embodiment, the buffer member 4 can also provide vibration damping characteristics similar to those illustrated in FIG. 3 in the first exemplary embodiment.

Although the vibrations as described above are generated due to a phase difference between the first magnet 6 or 10 and the second magnet 8 or 12, vibrations of the motor output shaft 2 may be transmitted to the driven-side magnetic force portion via the buffer member 4. Since the buffer member 4, however, is of soft quality as illustrated, vibrations are hardly transmitted between the motor output shaft 2 and the driven shaft 3, and noise can be prevented from increasing even if the transmission is not in a non-contact mode. Furthermore, further effects of noise insulation can be increased by mounting a damper, as discussed in Japanese Patent Application Laid-Open No. 11-082631.

The magnetic coupling can also be configured such that a relationship between an inertial mass with the drive-side flange 9 and the magnet 10 combined, i.e., an inertial mass Ia' of the drive-side magnetic force portion, and an inertial mass with the driven-side flange 11 and the magnet 12 combined, i.e., an inertial mass Ib' of the driven-side magnetic force portion, around a rotational axis O-O' is Ia'<Ib'. As a result, the magnetic coupling can have the functions similar to those in exemplary embodiments discussed in Japanese Patent Application Laid-Open No. 11-082631, so that vibrations of the driven shaft 3 can be reduced over the broad speed region without a damper specially mounted and with a simple configuration.

Even if the cylindrical magnets 10 and 12 include a plurality of magnets to form a cylindrical shape, similar advantageous effects can be obtained.

Furthermore, the magnet 10, serving as the first magnet, and the magnet 12, serving as the second magnet, can be magnetized into magnetic poles of the same polarity, thus exerting force for repelling each other, to enable transmitting rotation.

Third Exemplary Embodiment

Figure 5A:
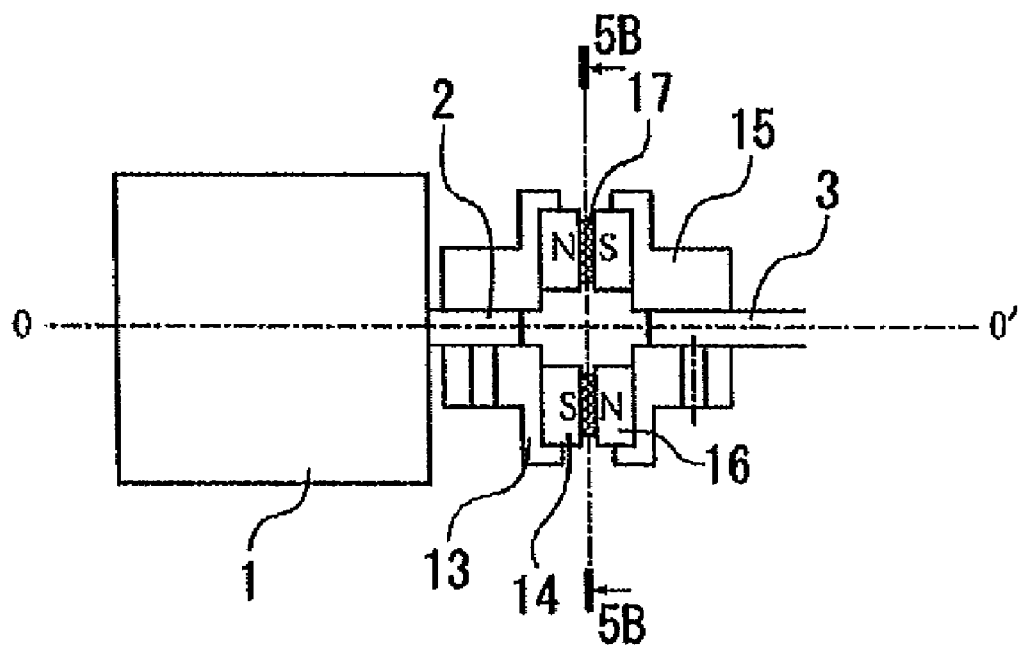
FIGS. 5A and 5B illustrate a configuration of a magnetic coupling according to a third exemplary embodiment of the present invention.
Figure 5B:
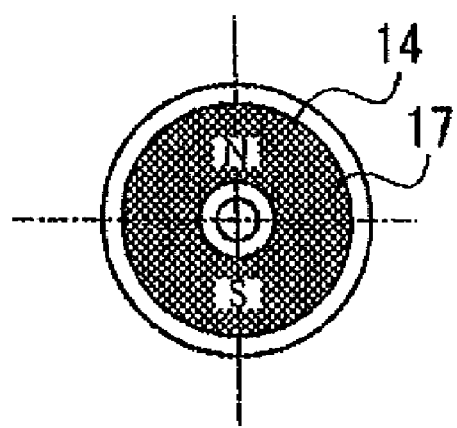

FIGS. 5A and 5B illustrate a configuration of a magnetic coupling according to a third exemplary embodiment of the present invention. FIG. 5B is a cross-sectional view taken along line 5B-5B in FIG. 5A.

A motor 1, acting as a driving source, transmits rotation of a motor output shaft 2 to a driven shaft 3 to drive a load (not illustrated). A drive-side flange 13, serving as a drive-side holding unit, is fixed to the motor output shaft 2 with a given fixing member, such as a set screw. A disc-shaped magnet 14, serving as a first magnet, is fixed to the drive-side flange 13 with a given fixing member, such as an adhesive agent. The drive-side flange 13 and the magnet 14 constitute a drive-side magnetic force portion. A driven-side flange 15, serving as a driven-side holding unit, is fixed to the driven shaft 3 with a given fixing member, such as a set screw. A disc-shaped magnet 16, serving as a second magnet, is fixed to the driven-side flange 15 with a given fixing member, such as an adhesive agent. The driven-side flange 15 and the magnet 16 constitute a driven-side magnetic force portion.

The magnet 14, serving as the first magnet, and the magnet 16, serving as the second magnet, are magnetized into at least a pair of magnetic poles to enable transmitting rotation. Thus, an attraction force acts in both magnets 14 and 16 to attract each other. In other words, a magnetic force acts between the drive-side magnetic force portion and the driven-side magnetic force portion.

According to the present exemplary embodiment, a buffer member 17, made of rubber with a predetermined rubber hardness, is located between the magnet 14, as a part of the drive-side magnetic force portion, and the magnet 16, as a part of the driven-side magnetic force portion, with a predetermined width and a predetermined deformation amount. The buffer member 17 can be sponge or magnetic fluid.

Although the buffer member 17 is configured to be in contact between the magnet 14 and the magnet 16 according to an exemplary embodiment, the buffer member 17 can be configured, for example, to be in contact with the drive-side flange 13, as a part of the drive-side magnetic force portion, and the driven-side flange 15, as a part of the driven-side magnetic force portion. Furthermore, the buffer member 17 can also be configured to be in contact with the magnet 14, as a part of the drive-side magnetic force portion, and the driven-side flange 15, as a part of the driven-side magnetic force portion. Alternatively, the buffer member 17 can be configured to be in contact with the entire drive-side magnetic force portion, including the magnet 14 and the drive-side flange 13, and the entire driven-side magnetic force portion, including the magnet 16 and the driven-side flange 15. The present exemplary embodiment is not limited to the configuration illustrated herein as long as the buffer member 17 is configured to be in contact between the drive-side magnetic force portion and the driven-side magnetic force portion.

When the motor output shaft 2 rotates in a predetermined direction at a predetermined speed with the motor 1 as a driving source, the magnet 14 rotates via the drive-side flange 13. Since the magnet 16 is attracted by the magnet 14 to transmit rotation, the rotation of the magnet 16 is transmitted to the driven-shaft 3 via the driven-side flange 15. Thus, force from the motor 1 is transmitted to a load (not illustrated).

The buffer member 17 concurrently contacts the flange 13 or the magnet 14 and the flange 15 or the magnet 16. Frictional force or attraction force, or both of them, occur between each surface of the flange 13 or the magnet 14 and the flange 15 or the magnet 16 and the buffer member 17. As a result, the buffer member 17 can dampen vibrations occurring due to a phase difference in rotation between the magnet 14 and the magnet 16. Either or both of the frictional force or the attraction force occurring between the buffer member 17 and the magnets 14 and 16 can reduce a phase difference occurring between the motor output shaft 2 and the driven shaft 3.

The magnetic coupling can also be configured such that a relationship between an inertial mass with the drive-side flange 13 and the magnet 14 combined, i.e., an inertial mass Ic of the drive-side magnetic force portion, and an inertial mass Id with the driven-side flange 15 and the magnet 16 combined, i.e., an inertial mass Id of the driven-side magnetic force portion, around a rotational axis O-O' is Ic<Id. As a result, the magnetic coupling can have the functions similar to those in exemplary embodiments discussed in Japanese Patent Application Laid-Open No. 11-082631, so that vibrations of the driven shaft 3 can be reduced over the broad speed region.

Even if the cylindrical magnets 14 and 16 include a plurality of magnets to form a cylindrical shape, similar advantageous effects can be obtained.

Furthermore, the magnet 14, serving as the first magnet, and the magnet 16, serving as the second magnet, can be magnetized into magnetic poles of the same polarity, thus exerting force for repelling each other, to enable transmitting rotation.

As described above, according to the first to the third exemplary embodiments, a buffer member made of rubber with a predetermined rubber hardness is located between the drive-side magnetic force portion and the driven-side magnetic force portion with a predetermined width and a predetermined deformation amount. The predetermined rubber hardness, the predetermined width, and the predetermined deformation amount are determined such that the buffer member can provide frictional force and attraction force acting between the drive-side magnetic force portion and the driven-side magnetic force portion to enable reducing vibrations occurring at the driven shaft. The buffer member can be sponge with a predetermined hardness or magnetic fluid with a predetermined viscosity instead of rubber with a predetermined hardness.

Fourth Exemplary Embodiment

Figure 6:
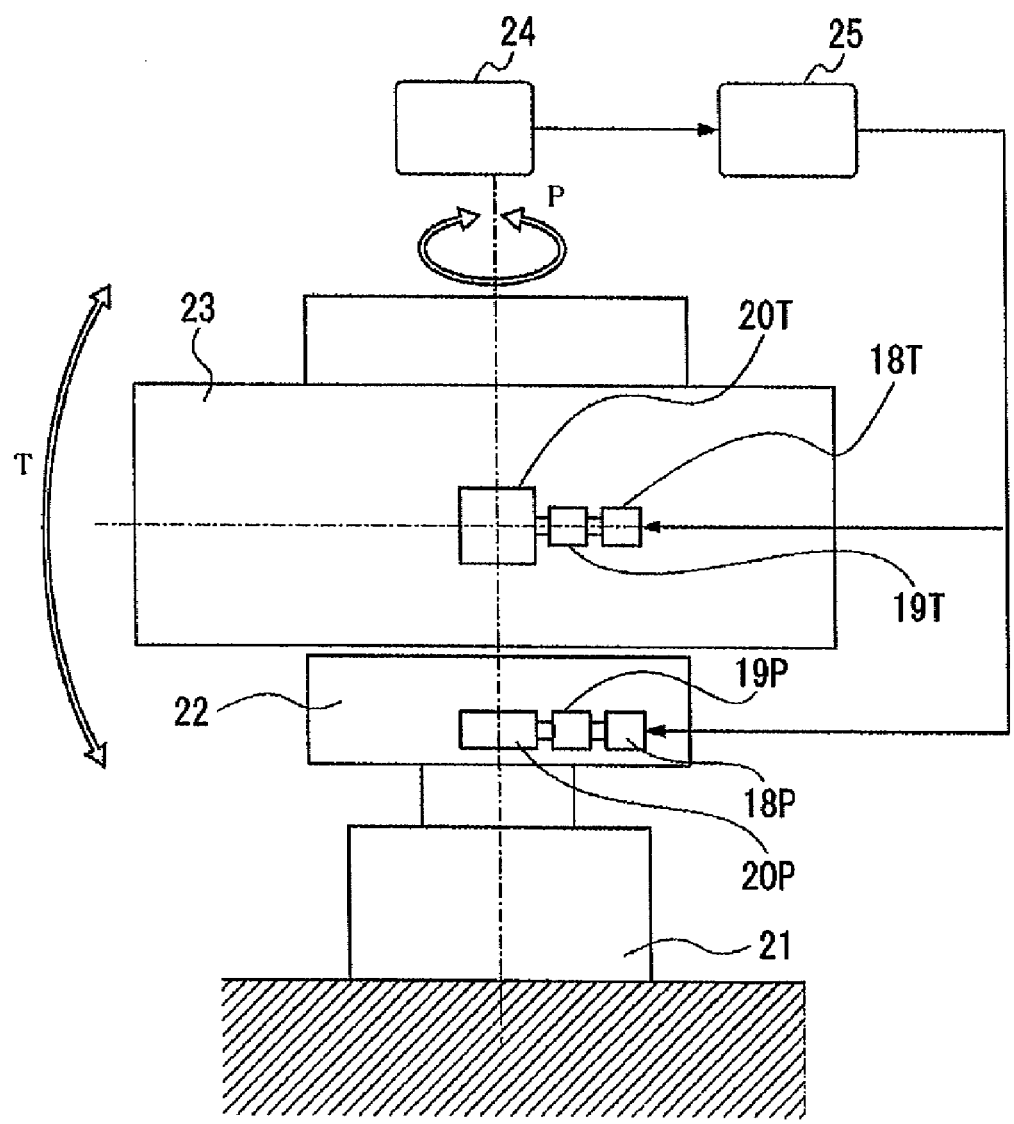
FIG. 6 illustrates a configuration of a camera platform using a magnetic coupling according to an exemplary embodiment of the present invention.

FIG. 6 illustrates a configuration of a camera platform using a magnetic coupling according to an exemplary embodiment of the present invention.

In the camera platform according to an exemplary embodiment, a control circuit 25 can receive a signal from an operation unit 24. In response to the signal, the control circuit 25 drives a motor 18T or a motor 18P, serving as a drive unit. Rotation of the motor 18T or the motor 18P is transmitted to an output device 20T or an output device 20P, serving as an output unit, via a magnetic coupling 19T or a magnetic coupling 19P, serving as a power transmission unit, thus driving the camera platform.

The camera platform includes a frame 22, which is capable of rotating in the direction of an arrow P around a base 21, and a case 23, which is capable of rotating in the direction of an arrow T around the frame 22. The case 23 contains amounted object (not illustrated). The camera platform is capable of changing the direction of the mounted object to a direction along the arrow P and the arrow T.

The motor 18T, the magnetic coupling 19T, and the output device 20T are mounted on a rotation shaft for rotation along the arrow T. The motor 18P, the magnetic coupling 19P, and the output device 20P are mounted on a rotation shaft for rotation along the arrow P. When the motor 18T or the motor 18P is driven, the magnetic coupling 19T or the magnetic coupling 19P transmits power of the motor 18T or the motor 18P to the output device 20T or the output device 20P. The camera platform rotates along the arrow P or the arrow T according to an output from the output device 20T or the output device 20P.

Since a buffer member is inserted between magnets of the magnetic coupling, the magnetic coupling can reduce vibrations occurring at the driven shaft, and the camera platform can control precise movement at any rotating speed while maintaining a silencing performance.

Although the fourth exemplary embodiment illustrates a camera platform, the embodiment is not limited to the camera platform but can be applied to any apparatus as long as the apparatus has a driving mechanism. The present exemplary embodiment can be applied to an optical apparatus having an optical system, particularly to an optical apparatus having a function of recording sounds, such as a video camera.

According to the above-described embodiments, locating a buffer member between a drive-side magnetic force portion and a driven-side magnetic force portion enables damping vibrations occurring when a phase difference occurs between magnets, thus facilitating precise control with a simple configuration.

Furthermore, since the buffer member provides frictional force and attraction force between the drive-side magnetic force portion and the driven-side magnetic force portion, a phase difference occurring between the drive shaft and the driven shaft can also be reduced.

Furthermore, since the buffer member is located between the drive-side magnetic force portion and the driven-side magnetic force portion, any foreign substance can be prevented from being inserted between the magnets.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-042659 filed Feb. 22, 2007, which is hereby incorporated by reference herein in its entirety.

What is claimed is:

1. A coupling configured to transmit power from a drive shaft to a driven shaft by magnetic force, the coupling comprising:
  a drive-side magnetic force portion including a first magnet and a first holding member holding the first magnet at a drive shaft side;

a driven-side magnetic force portion including a second magnet facing the first magnet and a second holding member holding the second magnet at a driven shaft side, wherein power is transmitted by magnetic force acting between the drive-side magnetic force portion and the driven-side magnetic force portion; and buffer member located between the drive-side magnetic force portion and the driven-side magnetic force portion and concurrently in contact with both the drive-side magnetic force portion and the driven-side magnetic force portion, wherein an inertial mass around a rotational axis of the driven-side magnetic force portion is greater than an inertial mass around a rotational axis of the drive-side magnetic force portion.

2. The coupling according to claim 1, wherein a frictional force or an attraction force, or both of them, works between the buffer member and the drive-side magnetic force portion and between the buffer member and the driven-side magnetic force portion.

3. The coupling according to claim 1, wherein the buffer member damps vibration that occurs due to a phase difference between the drive-side magnetic force portion and the driven-side magnetic force portion.

4. A camera platform comprising:
a drive unit including a drive shaft;
an output unit including a driven shaft;
a power transmission unit configured to transmit power generated by the drive unit from the drive shaft to the driven shaft, the power transmission unit including a coupling;
a control unit configured to control movement of the drive unit;
an operation unit configured to operate the control unit;
a mounting base configured to change a direction of a mounted object according to an output from the output unit,
wherein the coupling includes a drive-side magnetic force portion including a first magnet and a first holding member holding the first magnet at a drive shaft side, and a driven-side magnetic force portion including a second magnet facing the first magnet and a second holding member holding the second magnet at a driven shaft side,
wherein power is transmitted by magnetic force acting between the drive-side magnetic force portion and the driven-side magnetic force portion, and
wherein the coupling includes a buffer member located between the drive-side magnetic force portion and the driven-side magnetic force portion and concurrently in contact with both the drive-side magnetic force portion and the driven-side magnetic force portion.

5. The camera platform according to claim 4, wherein the frictional force or an attraction force, or both of them, works between the buffer member and the drive-side magnetic force portion and between the buffer member and the driven-side magnetic force portion.

6. The camera platform according to claim 4, wherein the buffer member damps vibration that occurs due to a phase difference between the drive-side magnetic force portion and the driven-side magnetic force portion.

* * * * *